United States Patent [19]
Yokota et al.

[11] Patent Number: 5,540,506
[45] Date of Patent: Jul. 30, 1996

[54] ROLLER AND CAGE ASSEMBLY

[75] Inventors: Yasunori Yokota; Kengo Hidano; Takashi Yatsu, all of Kanagawa-ken, Japan

[73] Assignee: Nippon Thompson Co., Ltd., Tokyo, Japan

[21] Appl. No.: 200,658

[22] Filed: Feb. 23, 1994

[30] Foreign Application Priority Data

| Feb. 25, 1993 | [JP] | Japan | 5-012663 U |
| Feb. 25, 1993 | [JP] | Japan | 5-012666 U |
| Feb. 25, 1993 | [JP] | Japan | 5-012667 U |
| Apr. 1, 1993 | [JP] | Japan | 5-021168 U |
| Apr. 1, 1993 | [JP] | Japan | 5-021169 U |

[51] Int. Cl.[6] .................................................. F16C 33/46
[52] U.S. Cl. ................................................... 384/580
[58] Field of Search .................................. 384/581, 572

[56] References Cited

U.S. PATENT DOCUMENTS

| 3,110,529 | 11/1963 | Schaeffler | 384/580 |
| 4,797,015 | 1/1989 | Hidano et al. | 384/580 |
| 4,874,260 | 10/1989 | Podhajecki | 384/580 X |
| 4,978,237 | 12/1990 | Motohashi et al. | 384/580 |
| 5,172,986 | 12/1992 | Yokota | 384/580 |

FOREIGN PATENT DOCUMENTS 441115  4/1992  Japan.

*Primary Examiner*—Thomas R. Hannon
*Attorney, Agent, or Firm*—Sughrue, Mion, Zinn, Macpeak & Seas; Richard C. Turner; Marc Kaufman

[57] ABSTRACT

Firstly, a roller and cage assembly is disclosed that achieves improved lubricating property while maintaining or increasing rigidity. While concave portions are formed so as to extend the width of the central portion of pockets to allow these to act as oil grooves, on the other hand, padding equivalent to lightening holes that are removed by providing said concave portions is performed in columns to obtain high rigidity.

Secondly, a roller and cage assembly is disclosed that together with being inexpensive and having high wear resistance, suppresses the generation of heat resulting from high-speed rotation. The above-mentioned effects are obtained by forming a composite plated film at prescribed sites by uniform dispersed coprecipitation of fine particles of fluororesin.

Thirdly, a roller and cage assembly is disclosed that together with suppressing the generation of heat resulting from high-speed rotation, also achieves light weight. The above-mentioned effects are obtained by using ceramic rollers.

3 Claims, 15 Drawing Sheets

ROLLER AND CAGE ASSEMBLY

BACKGROUND OF THE INVENTION

1. Field of the Invention

The present invention relates to a roller and cage assembly, and more particularly, to a roller and cage assembly having a favorable lubrication property and which is suitable for high-speed rotation.

2. Description of the Prior Art

Roller and cage assemblies that take advantage of the characteristics of having a small cross-sectional height and large load capacity were frequently used in the past for the connecting rods of motorcycle engines.

FIG. 1 shows a roller and cage assembly of the prior art. This roller and cage assembly is disclosed in Japanese Utility Model Laid-Open Publication No. 4-41115.

As shown in the drawing, this roller and cage assembly is composed of cage 1, in which a plurality of roughly cylindrically shaped pockets 1a are formed at equal intervals and parallel to the axial direction, and rollers 2, which are inserted into each of said pockets 1a.

Cage 1 forms two rings 1b, and bars 1c, which mutually couple both said rings 1b and demarcate said pockets 1a together with each of said rings 1b, into a single unit. One pair each of inner retaining projections 1g and outer retaining projections 1h are formed on both of the insides as well as on both of the outsides of both ends of these columns 1c. These inner retaining projections 1g and outer retaining projections 1h project so as to face pockets 1a, and as a result, rollers 2 are restricted from falling out of pockets 1a.

The above-mentioned inner retaining projections 1g and outer retaining projections 1h are formed by providing two each of caulking grooves 1i and 1j in both the inner and outer surfaces of bars 1c so as to extend in the circumferential direction. These caulking grooves 1i and 1j act as oil grooves resulting in efficient lubrication.

Recently, the rotating speeds of engines have tended to increase. In order to allow the roller and cage assembly of the prior art to be compatible with these increasing engine speeds, the lubricating property was improved by providing oil grooves like those described above to prevent wear and seizure. However, the rotating speeds at which the roller and cage assembly of the prior art was able to withstand were still not satisfactory. Thus, this is a problem that should be solved in terms of development of engines having even higher rotating speeds.

Furthermore, although the lubrication property increases if the number of concave portions acting as oil grooves is increased or their area is expanded, since the rigidity of the cage decreases proportionally thus preventing it from being used practically, this cannot be performed simply.

On the other hand, in the roller and cage assembly of the prior art, wear and seizure is suppressed by performing copper or silver plating in order to accommodate increasing engine speeds. Although roller and cage assemblies on which silver plating has been performed allow the obtaining of favorable high-speed rotation performance in comparison with those on which copper plating has been performed, the maximum rotating speed these roller and cage assemblies are able to withstand is roughly 13,000 rpm. When the rotating speed is increased beyond this point, the disadvantage results in which wear and seizure occur even if considerably large amounts of lubricating oil is supplied. In addition, plating treatment using silver results in high costs, and this is also a problem that should be solved in terms of engine development.

Moreover, the roller and cage assembly of the prior art generates remarkably high levels of heat during high-speed rotation. In addition, it is also considerably heavy. These are also problems that should be solved in terms of engine development.

SUMMARY OF THE INVENTION

In consideration of the above-mentioned disadvantages of the prior art, a first object of the present invention is to provide a roller and cage assembly that achieves improvement of the lubrication properties while maintaining or increasing rigidity.

In addition, a second object of the present invention is to provide an inexpensive roller and cage assembly that together with having high wear resistance, suppresses the generation of heat resulting from high-speed rotation.

Moreover, a third object of the present invention is to provide a roller and cage assembly that achieves suppression of generation of heat resulting from high-speed rotation as well as being lightweight.

In order to achieve the above-mentioned first object, the present invention consists of a roller and cage assembly comprising: a cage in which a plurality of bars are arranged in a row in the circumferential direction so as to demarcate a plurality of cylindrically shaped pockets in parallel in the axial direction; rollers that are inserted into each of said pockets; and, inner retaining projections and outer retaining projections that restrict said rollers from falling out to the inside and outside, which protrude so that a portion of said bars faces said pockets as a result of providing caulking grooves on the inner and outer surfaces of each of said bars extending in the circumferential direction; wherein, together with forming concave portions in the center of the above bars with respect to cage width so as to extend the width of a portion of said pockets on both sides in the circumferential direction, padding equivalent to lightening holes that are removed as a result of forming said concave portions is formed in the insides of said bars.

In addition, in order to achieve the above-mentioned second object, the present invention consists of a roller and cage assembly comprising: a cage in which a plurality of roughly cylindrically shaped pockets are formed in parallel in the axial direction; and, rollers that are inserted into each of said pockets; wherein, composite plated films are formed at prescribed sites consisting of the uniform dispersed coprecipitation of fine particles of fluororesin.

Moreover, in order to achieve the above-mentioned third object, the present invention consists of a roller and cage assembly comprising: a cage in which a plurality of roughly cylindrically shaped pockets are formed in parallel in the axial direction; and, rollers that are inserted into each of said pockets; wherein, said rollers are made of ceramics.

DESCRIPTION OF THE PREFERRED EMBODIMENTS

The following provides an explanation of a first embodiment of the roller and cage assembly of the present invention with reference to the attached drawings.

As shown in FIGS. 2 through 5, said roller and cage assembly is composed of cage 11, in which a plurality of cylindrically shaped pockets 11a are formed at equal intervals in the circumferential direction and in parallel to the axial direction, and needle-shaped rollers 12 that are inserted into each of said pockets 11a. Furthermore, pockets 11a are formed so that their dimensions are slightly larger than the dimensions of rollers 12 with the exception of the dimensions between each retaining projection to be described later.

Figure 1:
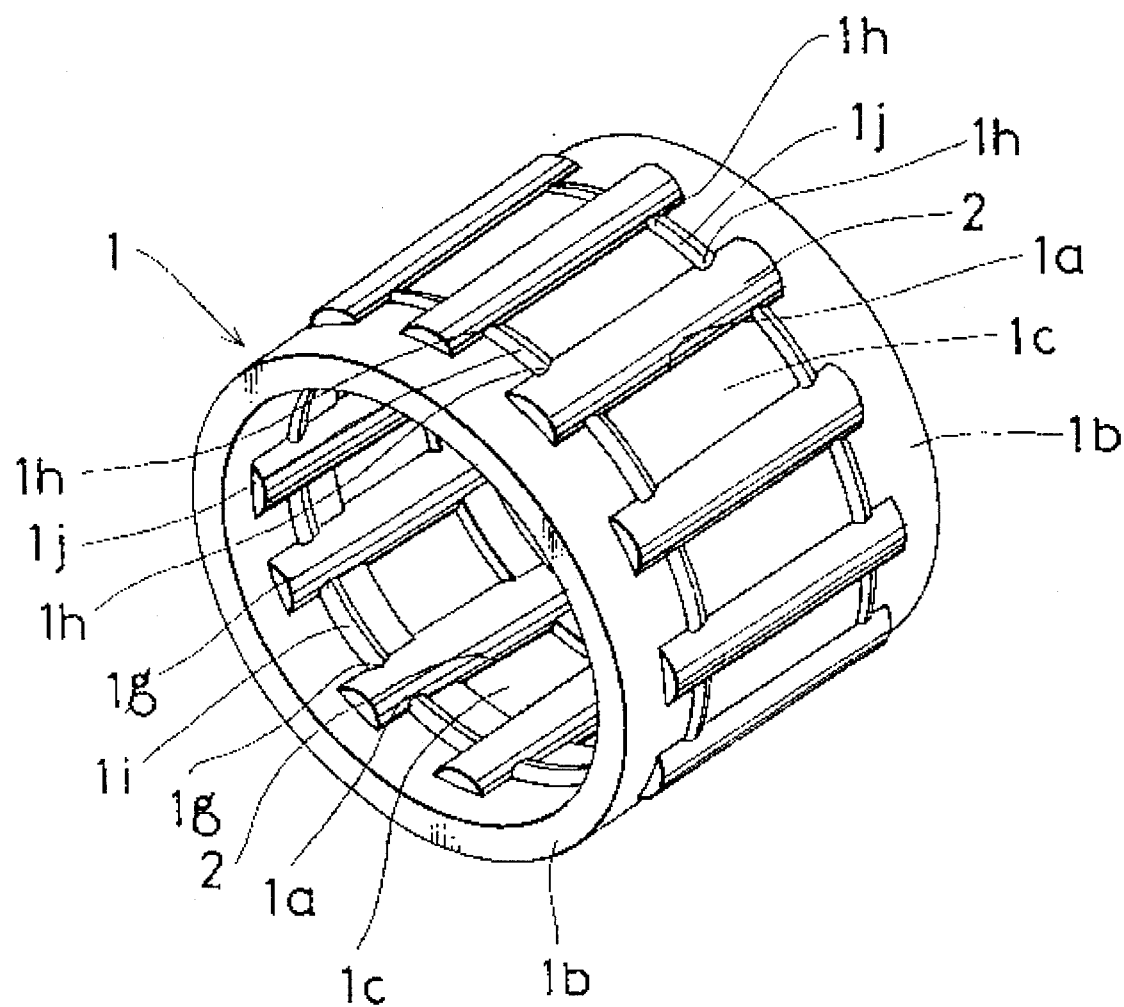
FIG. 1 is a perspective view of a roller and cage assembly of the prior art.
Figure 2:
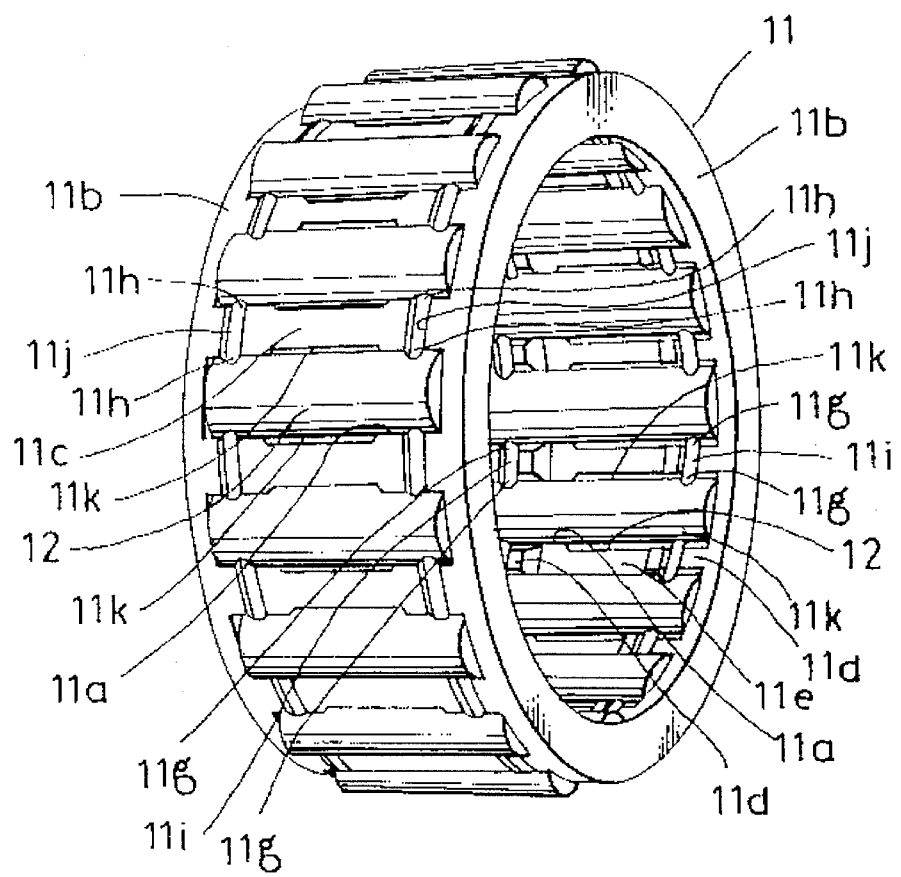
FIG. 2 is a perspective view of a first embodiment of the roller and cage assembly of the present invention.
Figure 3:
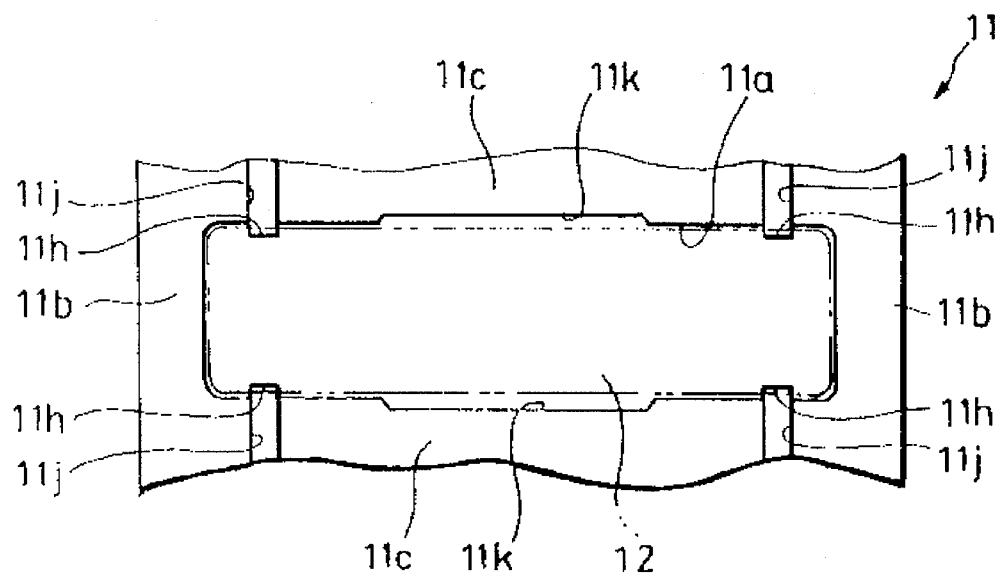
FIG. 3 is an overhead view of a portion of the roller and cage assembly shown in FIG. 2.

Cage 11 forms two (cage) rings 11b and a plurality of (cage) bars 11c, arranged in a row in the circumferential direction so as to mutually couple both said rings 11b and demarcate each of said pockets 11a, into a single unit. As is clear from FIGS. 4 and 5, bars 11c have thick-walled portions 11d, each connected to both rings 11b, and thin-walled portions 11e juxtaposed between said thick-walled portions 11d. Roughly U-shaped concave portion 11f is demarcated in the center of the inside of bar 11c by these thick-walled portions 11d and thin-walled portions 11e. Furthermore, thick-walled portions 11d and thin-walled portions 11e are also shown in FIG. 2. Said concave portion 11f is provided in the form of a so-called lightening hole for reducing the weight of cage 1, and extends further to the outside than the pitch circle diameter (P.C.D.) of roller 12, and is also formed shorter than the length of pocket 11a.

A pair of inner retaining projections 11g are formed on both sides in the vicinity of both ends of said bars 11c, namely in each of thick-walled portions 11d. In addition, a pair of outer retaining projections 11h are formed on the outside at sites corresponding to said inner retaining projections 11g. These inner retaining projections 11g and outer retaining projections 11h protrude so as to face inside pockets 11a, and the interval between corresponding retaining projections of neighboring (cage) bars 11c in the circumferential direction is set to be slightly smaller than the diameter of rollers 12. As a result, rollers 12 are retained and thereby restricted from falling out of pockets 11a.

The above-mentioned inner retaining projections 11g and outer retaining projections 11h are formed by providing caulking grooves 11i and 11j so as to extend in the circumferential direction in both the inner and outer surfaces of bars 11c. Thus, since each retaining projection is formed only by caulking processing, they facilitate volume production and can be fabricated inexpensively. In addition, since these caulking grooves 11i and 11j act as so-called oil grooves, efficient lubrication is performed.

As is clear from each of the drawings, concave portions 11k of a prescribed length are formed in both sides in the circumferential direction of each bar 11c, and more specifically, in both sides of thin-walled portions 11e at the center of said bars 11c with respect to cage width, so as to extend the width of a portion of said pockets 11a demarcated by said stays 11c. These concave portions 11k act as oil grooves together with said caulking grooves 11i and 11j. However, in order to maintain or increase the rigidity of thin-walled portions 11e, the width dimensions of which have become smaller as a result of forming lightening holes by providing these concave portions 11k, padding equivalent to these lightening holes is formed in the insides of said thin-walled portions 11e, and thickness $t_1$ (FIG. 4) of said thin-walled portions 11e is set slightly thicker. By providing this padding for thin-walled portions 11e in this manner, the section modulus of said thin-wailed portions in the radial direction, and thus their rigidity, is greatly increased. This is an effective means of increasing mechanical strength with respect to roller and cage assemblies bearing radial loads.

As described above, since a large number of oil grooves are provided, lubrication is adequately performed and seizure is prevented, thus making said roller and cage assembly suitable for high-speed rotation.

Figure 4:
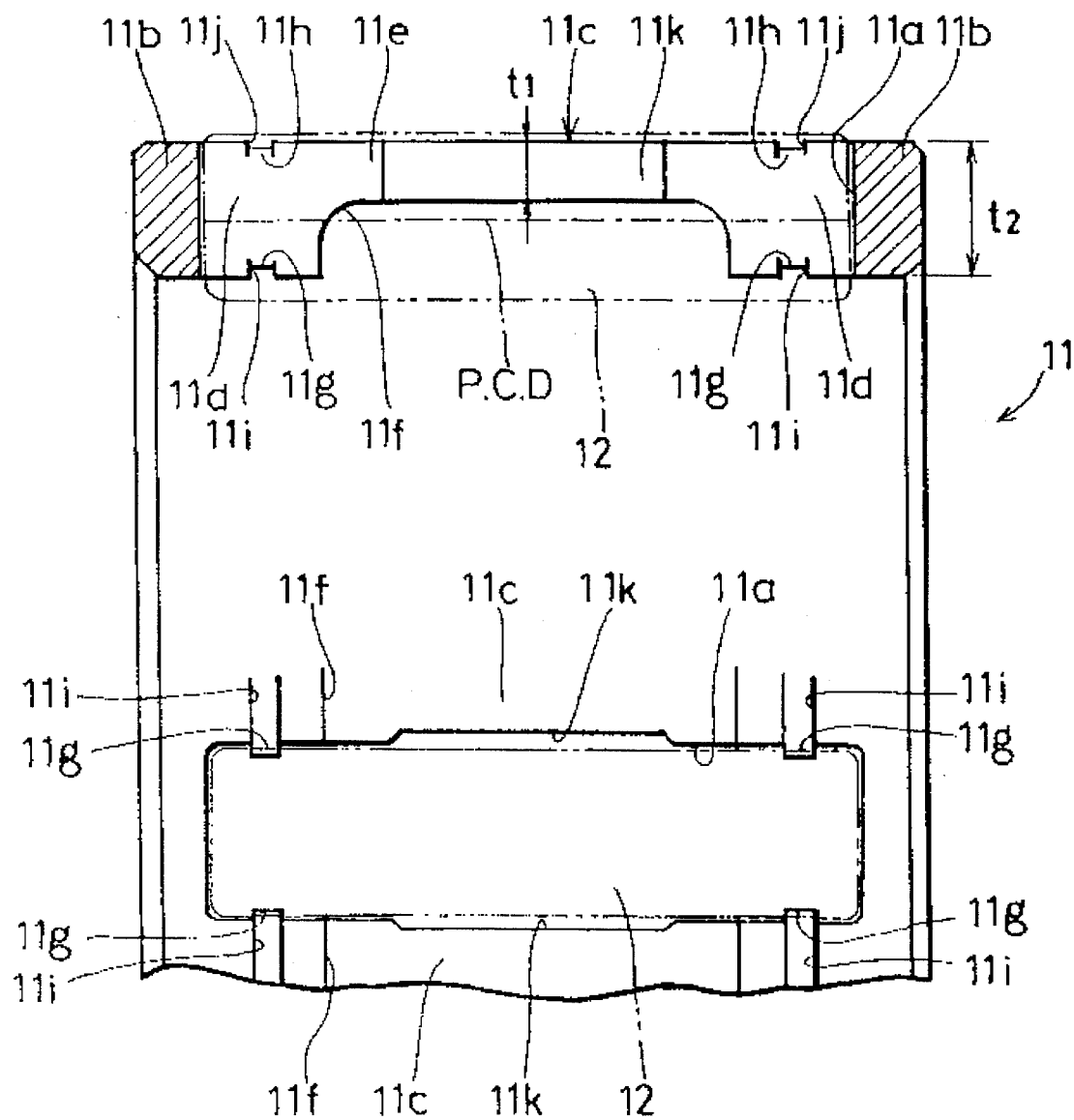
FIG. 4 is a longitudinal cross-sectional view of the state in which a portion of the roller and cage assembly shown in FIG. 2 is severed along a surface that includes the axial direction.

Furthermore, as is clear from FIG. 4, with respect to thick-walled portions 11d that compose bars 11c together with the above-mentioned thin-walled portions 11e, since their thickness $t_2$ is set larger to be equal to the thickness of rings 11b, together with this allowing their shape to be simplified as well as facilitating cutting processing to allow them to be fabricated inexpensively, the rigidity of bridges in the form of bars 11c is improved thus making caulking processing easier. Thus, the above-mentioned inner retaining projections 11g and outer retaining projections 11h can be formed with high precision, and the amount of their protrusion can be stabilized, thus allowing them to reliably retain rollers 12.

Figure 5:
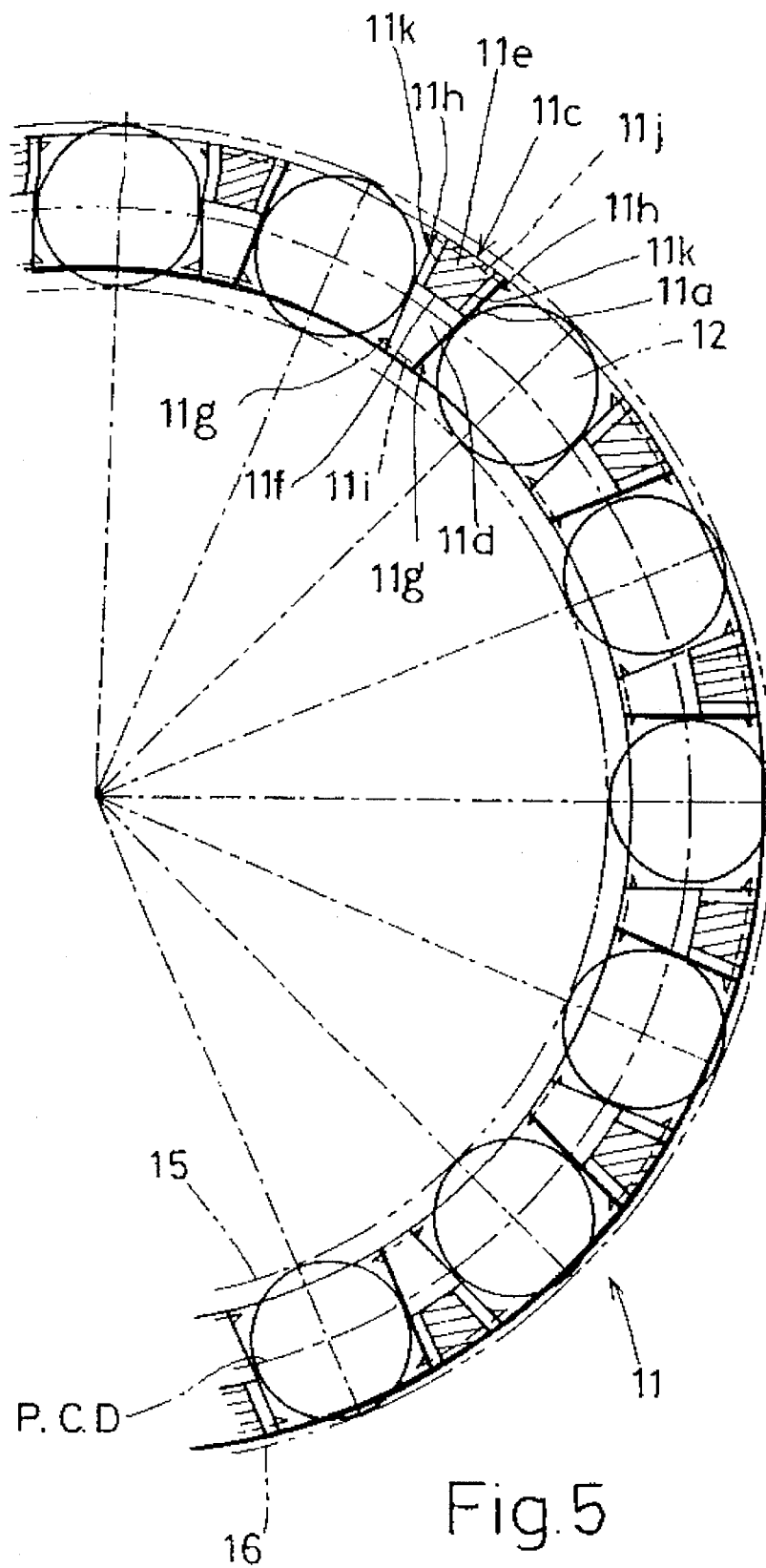
FIG. 5 is a longitudinal cross-sectional view of the state in which a portion of the roller and cage assembly shown in FIG. 2 is severed along a surface perpendicular to the axial direction.

FIG. 5 shows said roller and cage assembly fitted onto shaft 15 and outer ring 16. When used in this manner, roller 12 makes contact with roller guiding surfaces formed on both sides of the above-mentioned thick-walled portion 11d. Roller 12 is then guided nearly over P.C.D., and dimensions are set so that it does not make contact with inner and outer retaining projections 11g and 11h. Moreover, dimensions are also set so that the traveling surface of outer ring 16 and the outer surface of cage 11 make contact before contact is made between the inner surface of cage 11 and shaft 15.

Figure 6:
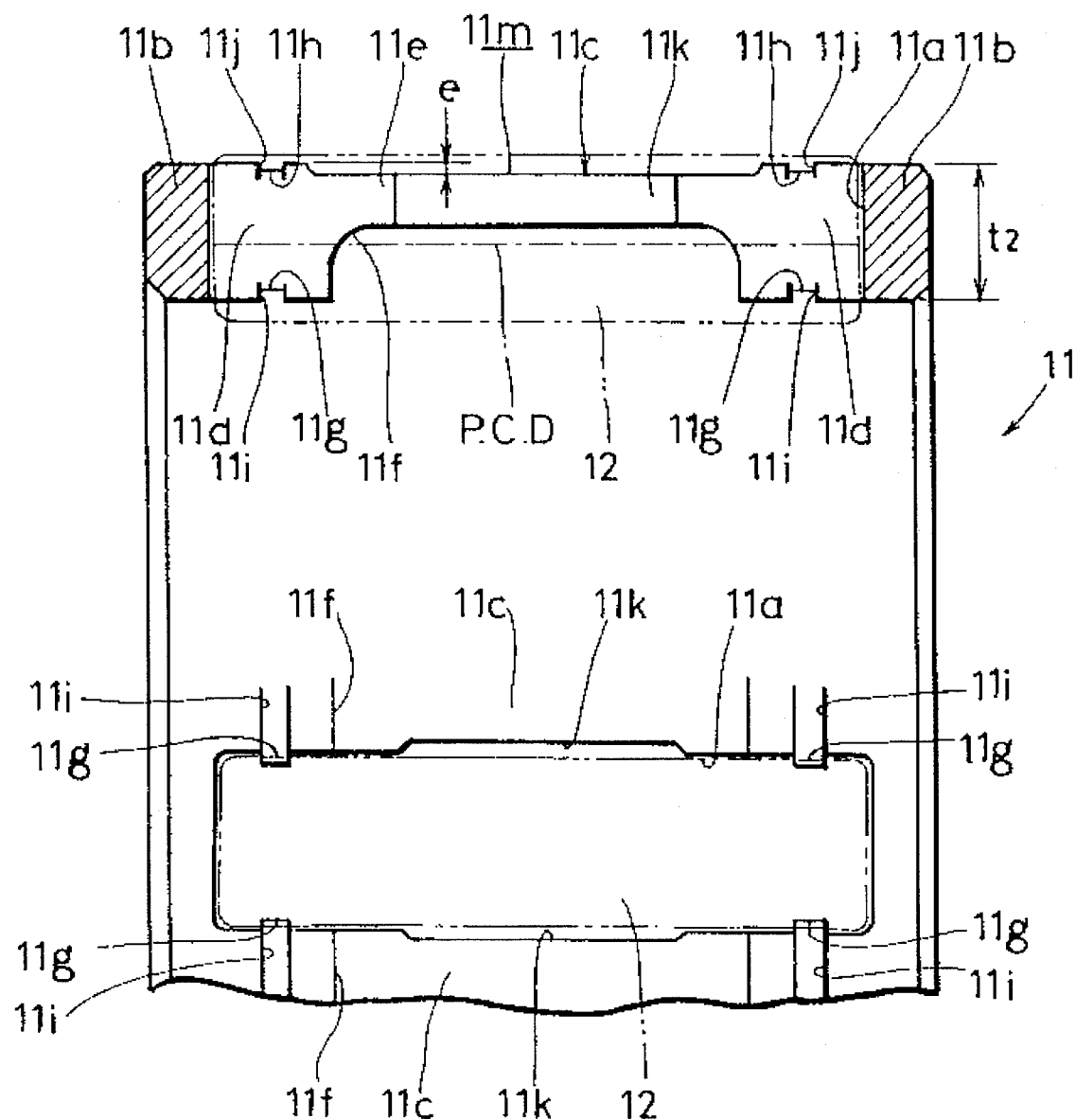
FIG. 6 is a longitudinal cross-sectional view of the state in which a portion of a second embodiment of the roller and cage assembly of the present invention is severed along a surface that contains the axial direction.
Figure 7:
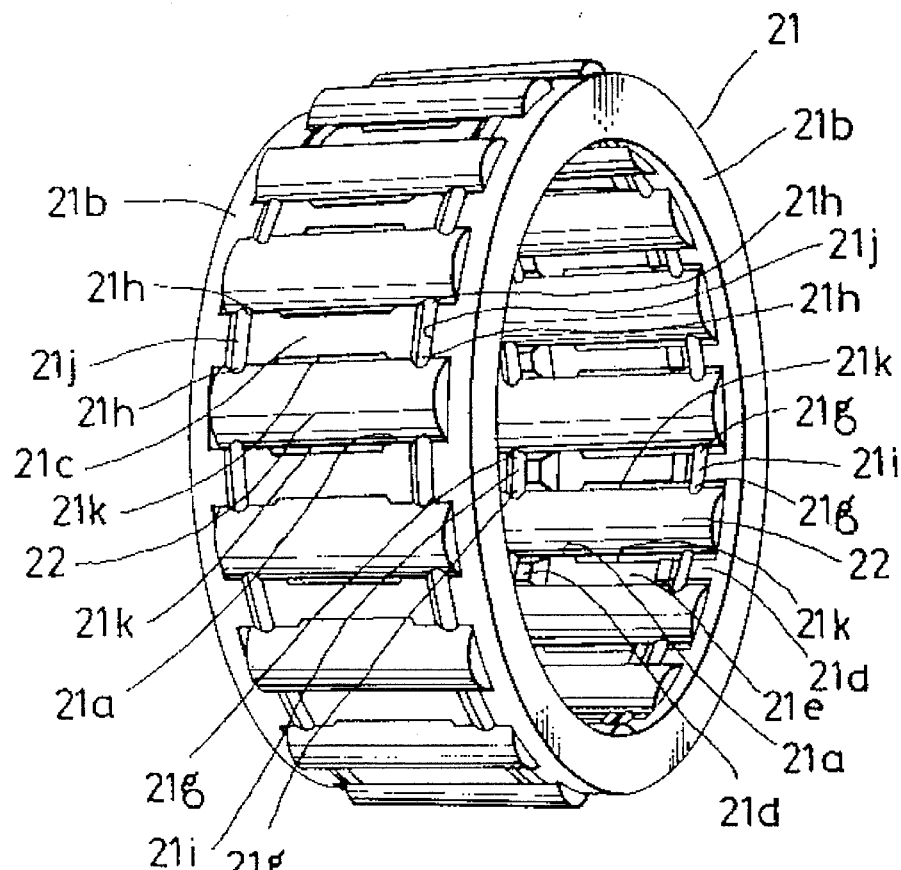
FIG. 7 is a perspective view of a third embodiment of the roller and cage assembly of the present invention.
Figure 8:
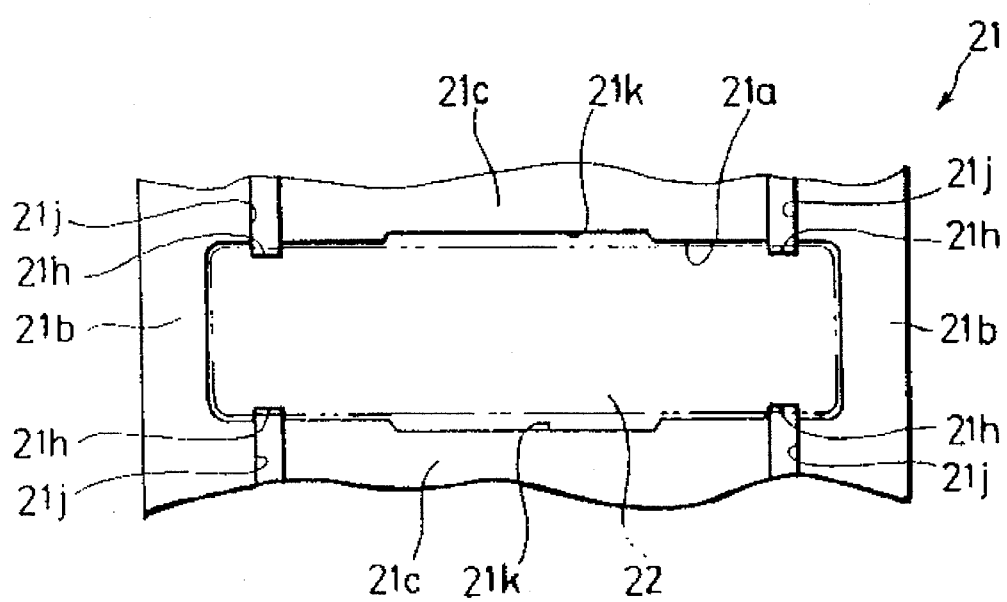
FIG. 8 is an overhead view of a portion of the roller and cage assembly shown in FIG. 7.

The following provides an explanation of a second embodiment of the roller and cage assembly of the present invention using FIG. 6. Furthermore, since said roller and cage assembly is composed in the same manner as the first embodiment of the roller and cage assembly shown in FIGS. 2 through 5 with the exception of those portions explained below, an overall explanation will be omitted here, with the explanation only focusing on the essential portions. In addition, the same reference numerals are used for those constituent members that are identical to the constituent members of the roller and cage assembly of the first embodiment.

As shown in the drawing, in this roller and cage assembly, concave portions 11m are formed extending in the axial direction in the inside of outer retaining projections 11h and in the outside of each (cage) bar 11c of cage 11. These concave portions 11m are formed over the entire width of bars 11c, and are connected with the above-mentioned pockets 11a. Depth e of said concave portions 11m is set at roughly 0.1–0.2 mm. These concave portions 11m also act as oil grooves to increase lubrication property, thus making it difficult for seizure and so forth to occur even in the case of high-speed rotation. In addition, as a result of providing said concave portions 11m, together with the surface area that makes contact with the inner diameter side of a connecting rod being decreased, the weight of the roller and cage assembly is further reduced.

The following provides an explanation of a third embodiment of the roller and cage assembly of the present invention with reference to the attached drawings.

As shown in FIGS. 7 through 10, said roller and cage assembly is composed of cage 21, in which a plurality of cylindrically shaped pockets 21a are formed at equal intervals in parallel and in the circumferential direction, and needle-shaped rollers 22 that are inserted into each of said pockets 21a. Furthermore, pockets 21a are formed so that their dimensions are slightly larger than the dimensions of rollers 22 with the exception of the dimensions between each of the retaining projections to be described later.

Cage 21 forms two (cage) rings 21b and (cage) bars 21c that mutually couple both said rings 21b and demarcate said pockets 11a together with said rings 21b, into a single unit. As is clear from FIGS. 9 and 10, bars 21c have thick-walled portions 21d, each connected to both rings 21b, and thin-walled portions 21e juxtapositioned between said thick-walled portions 21d. Roughly U-shaped concave portion 21f is demarcated on the inside of cage 21 by these thick-walled portions 21d and thin-walled portions 21e. Said concave portion 21f is provided in the form of a so-called lightening hole for reducing the weight of cage 21, and extends farther to the outside than the pitch circle diameter (P.C.D.) of roller 22.

Inner retaining projections 21g are formed on both sides of the inner surfaces in the vicinity of both ends of said bars 21c, namely in each of thick-walled portions 21d, while a pair of outer retaining projections 21h are formed on the outside at sites corresponding to said inner retaining projections 21g. These inner retaining projections 21g and outer retaining projections 21h protrude so as to face inside pockets 21a, and the interval between corresponding retaining projections of neighboring (cage) bars 21c in the circumferential direction is set to be slightly smaller than the diameter of rollers 22. As a result, rollers 22 are retained and thereby restricted from falling out of pockets 21a.

The above-mentioned inner retaining projections 21g and outer retaining projections 21h are formed by providing caulking grooves 21i and 21j so as to extend in the circumferential direction in both the inner and outer surfaces of bars 21c. Thus, since each retaining projection is formed only by caulking processing, they facilitate volume production and can be fabricated inexpensively. In addition, since these caulking grooves 21i and 21j act as so-called oil grooves, efficient lubrication is performed.

As is clear from each of the drawings, concave portions 21k of a prescribed length are formed in both sides of each bar 21c, and more specifically, in both sides of thin-walled portions 21e, so as to extend the width of a portion of said pockets 21a demarcated by said bars 21c. These concave portions 21k act as oil grooves together with said caulking grooves 21i and 21j. However, in order to maintain the rigidity of thin-walled portions 21e, the width dimensions of which have become smaller as a result of providing these concave portions 21k, the thickness $t_1$ (FIG. 9) of said thin-walled portions 21e is set slightly thicker.

As described above, since a large number of oil grooves are provided, lubrication is adequately performed and seizure is prevented, thus making said roller and cage assembly suitable for high-speed rotation.

Figure 9:
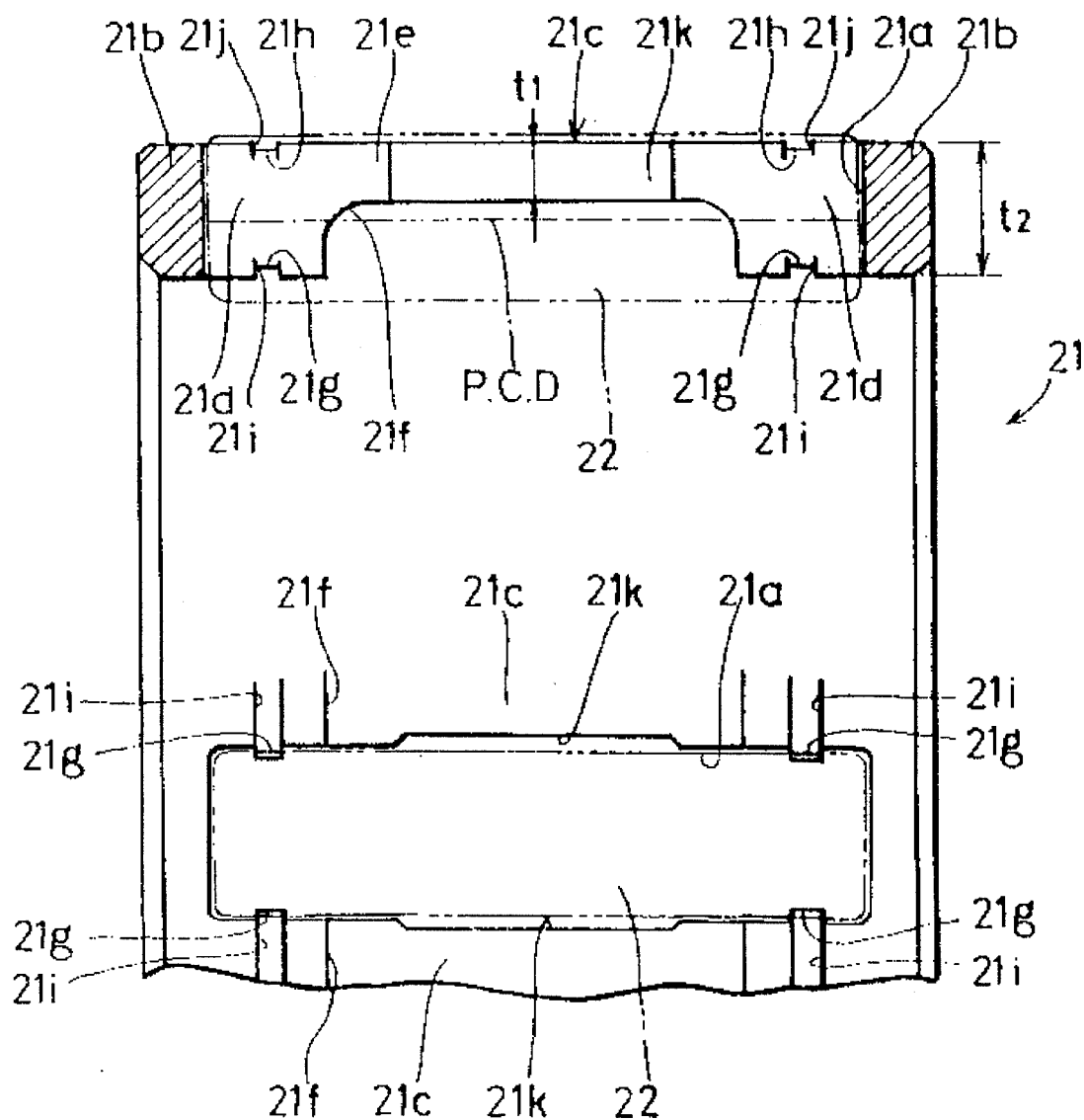
FIG. 9 is longitudinal cross-sectional view of the state in which a portion of the roller and cage assembly shown in FIG. 7 is severed along a surface including the axial direction.

Furthermore, as is clear from FIG. 9, with respect to thick-walled portions 21d that compose bars 21c together with the above-mentioned thin-walled portions 21e, since their thickness $t_2$ is set larger to be equal to the thickness of rings 21b, together with this allowing their shape to be simplified as well as facilitating cutting processing to allow them to be fabricated inexpensively, the rigidity of bridges in the form of bars 21c is improved thus making caulking processing easier. Thus, the above-mentioned inner retaining projections 21g and outer retaining projections 21h can be formed with high precision, and the amount of their protrusion can be stabilized, thus allowing them to reliably retain rollers 22.

Figure 10:
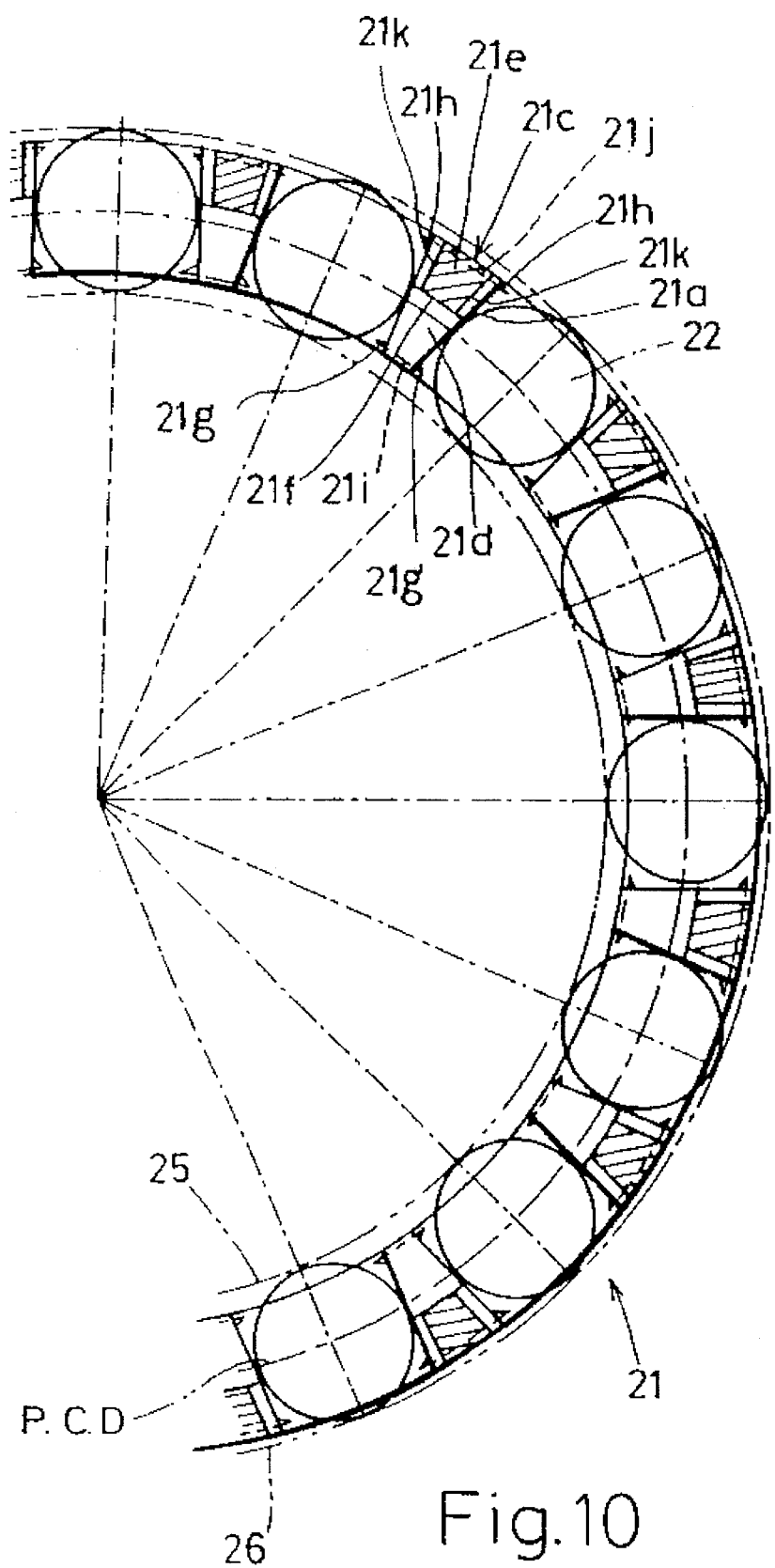
FIG. 10 is a longitudinal cross-sectional view of the state in which a portion of the roller and cage assembly shown in FIG. 7 is severed along a surface perpendicular to the axial direction.

FIG. 10 shows said roller and cage assembly fitted onto shaft 25 and outer ring 26. When used in this manner, roller 22 makes contact with roller guiding surfaces formed on both sides of the above-mentioned thick-walled portion 21d. Roller 22 is then guided nearly over P.C.D., and dimensions are set so that it does not make contact with inner and outer retaining projections 21g and 21h. Moreover, dimensions are also set so that the traveling surface of outer ring 26 and the outer surface of cage 21 make contact before contact is made between the inner surface of cage 21 and shaft 25.

In the above-mentioned roller and cage assembly, cage 21 is made of, for example, cemented steel (SCM415, STKM13 and so forth), while rollers 22 are fabricated using ball-bearing steel (SUJ2 and so forth).

Figure 11:
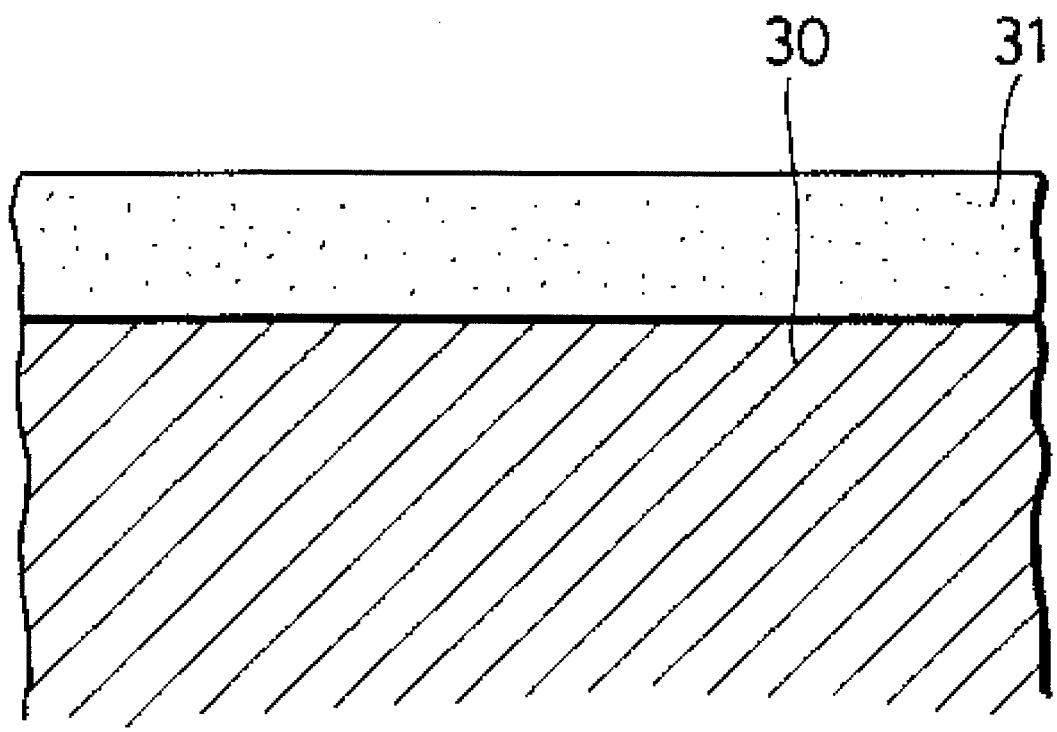
FIG. 11 is an enlarged cross-sectional view of a portion of the roller and cage assembly shown in FIG. 7.

As shown in FIG. 11, a composite plated film 31 is formed on the surface of base material 30 of cage 21 by plating treatment. Furthermore, FIG. 11 shows an enlarged view of actual dimensions. The thickness of composite plated film 31 is actually roughly 5 μm. This composite plated film 31 is formed by uniform dispersed coprecipitation of fine particles of fluororesin (ethylene tetrafluoride) in a matrix. In said drawing, the black dots represent the fine particles of fluororesin, while the white portion other than the black dots represents the matrix.

Table 1 shown below indicates the composition of the above-mentioned composite plated film 31. However, in this table, two types of compositions are shown, one having a high content of fluororesin (PTFE) (Type A) and one having a low content (Type B).

TABLE 1

| Properties | A. High-Content Type For non-sticking, low wear use | B. Low Content Type For wear resistance and sliding use |
| --- | --- | --- |
| Nickel (Ni) wt % | 83–86 | 88–90 |
| Phosphorous (P) wt % | 7.5–9 | 8–9.5 |
| Fluororesin (PTFE) wt % | 6–8.5 (20–25 vol %) | 1.5–3 (5–10 vol %) |
| Fluororesin μm particle size | <1 | <1 |
| Density g/cm$^3$ | 6.4–6.8 | 7.3–7.6 |
| Hardness after plating HV | 250–350 | 400–500 |
| Hardness after heat treatment HV | 400–500 | 750–900 |

As is clear from the above table, the matrix of composite plated film 31 consists primarily of nickel (Ni: non-electrolytic), and contains phosphorous (P). Furthermore, although a composite plated film 31 having the composition shown in said table is commercially available under the name "Kanifron" (trade name: Nippon Kanizen Co., Ltd.), it goes without saying that various compositions of films can be applied provided that it is a composite plated film formed by dispersed coprecipitation of fluororesin particles. In addition, the nickel contained in the form of a matrix is not limited to that which is non-electrolytic, but electrolytic nickel may also be used. In addition, substances other than nickel can be used for the matrix of the composite plated film.

Moreover, said table also shows the hardness (Vicker's hardness: HV) of composite plated film 31 both before and after heat treatment. As is clear from those values, the hardness of the film after adding heat treatment is greater than before. However, with respect to this hardness, better results are obtained for type B than type A shown in the above table.

As described above, in the roller and cage assembly as claimed in the present invention, a composite plated film 31, composed of the dispersed coprecipitation of fine particles of fluororesin, is formed on the portion of cage 21 that makes sliding contact with rollers 22 as well as the portions of cage 21 that make sliding contact with other components in the form of shaft 25 and outer ring 26 that are to be assembled with it. Thus, the composite plated film containing fine particles of fluororesin has an excellent self-lubricating property, and together with having high wear resistance, is also able to suppress the temperature rise accompanying high-speed rotation to a low level. Thus, it is suitable for use in bearings equipped on the connecting rods and so forth of high-speed engines since it promotes long service life. In addition, since its self-lubricating property is large when also used as a general-purpose bearing, the above-mentioned effects are demonstrated even during relatively low levels of lubrication or in the absence of lubrication.

Seizure of roller and cage assemblies occurs due to the amount of heat produced by friction. A comparative test of breakdown pV values was conducted using a centrifugal load bearing tester for the roller and cage assembly on which plating treatment had been performed as claimed in the present invention, and a roller and cage assembly on which conventional silver plating of the same dimensions had been performed.

Here, p: Contact pressure of the outer surface of the cage (N/cm$^2$) and,

V: Sliding velocity of the outer surface of the cage [m/s]

In the above-mentioned tester, the pV value was determined when the roller and cage assembly demonstrated seizure as the pV value was increased while maintaining the amount of lubricating oil supplied constant. As a result of this experiment, the roller and cage assembly having a composite plated film according to the present invention demonstrated roughly 1.9 times greater pV resistance (shown below) than the roller and cage assembly having conventional silver plating. Furthermore, this value is equivalent to the pV value on the inner surface of the cage in the case of a maximum rotating speed of n=16,000 rpm on an actual engine connecting rod.

$$pV=678(N/cm^2 \cdot m/s)$$

Furthermore, in this case, each of the major dimensions of the roller and cage assembly used as the testpiece in the above-mentioned experiment were as shown below.

Fw: Inner contact diameter=22 mm

Ew: Outer contact diameter=29 mm

Bc: Cage width=17 mm

Dw: Roller diameter=3.5 mm

Lw: Roller length=13.8 mm

Z: No. of rollers=14

The above-mentioned composite plated film 31 can be formed less expensively in comparison with the conventional silver plated film, thus allowing reduced costs to be achieved. In addition, since the fluororesin particles contained in composite plated film 31 also demonstrates a cushioning action in addition to self-lubricating action, silencing effects are also obtained as a result.

Figure 12:
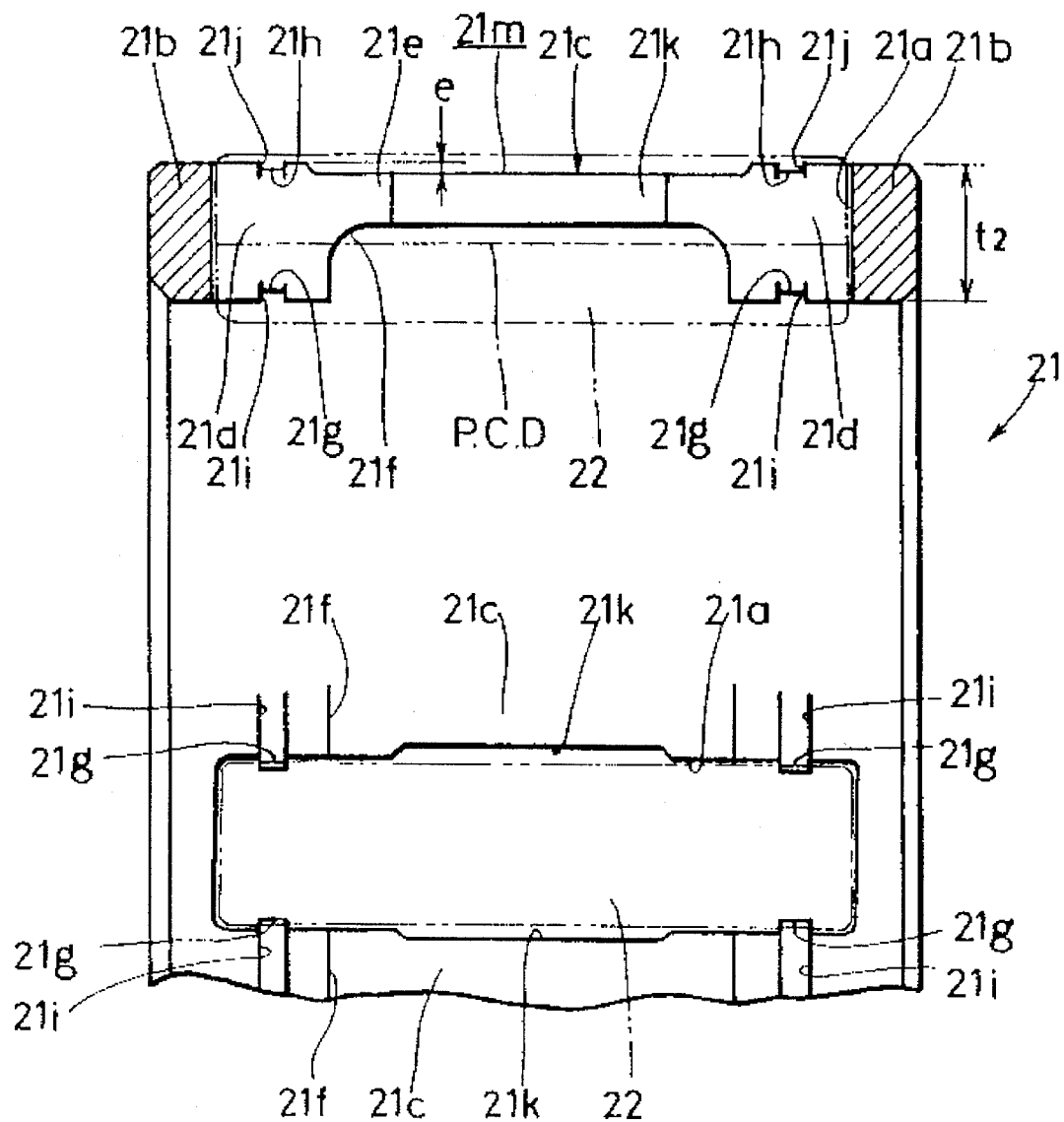
FIG. 12 is a longitudinal cross-sectional of the state in which a portion of a fourth embodiment of the roller and cage assembly of the present invention is severed along a surface including the axial direction.

The following provides an explanation of a fourth embodiment of the roller and cage assembly of the present invention, referring to FIG. 12. Furthermore, since said roller and cage assembly is composed in the same manner as the third embodiment of the roller and cage assembly shown in FIGS. 7 through 11 with the exception of those portions explained below, an overall explanation will be omitted here, with the explanation only focusing on the essential portions. In addition, the same reference numerals are used for those constituent members that are identical to the constituent members of the roller and cage assembly of the third embodiment.

As shown in the drawings, in this roller and cage assembly, concave portions 21m are formed extending in the axial direction in the inside of outer retaining projections 21h and in the outside of each (cage) bar 21c of cage 21. These concave portions 21m are formed over the entire width of bars 21c, and their depth is set to roughly 0.1–0.2 mm. These concave portions 21m also act as oil grooves to increase the lubrication property, thus making it difficult for seizure and so forth to occur even in the case of high-speed rotation. In addition, as a result of providing said concave portions 21m, together with the surface area that makes contact with the inner diameter side of a connecting rod being decreased, the weight of the roller and cage assembly is further reduced.

Furthermore, although composite plated film 31 is formed over the entire surface of cage 21 in each of the embodiments described above, it may also only be formed at those sites that are particularly susceptible to wear and so forth.

The following provides an explanation of a fifth embodiment of the roller and cage assembly of the present invention with reference to the attached drawings.

As shown in FIGS. 13 through 16, said roller and cage assembly is composed of cage 41, in which a plurality of cylindrically shaped pockets 41a are formed at equal intervals in the circumferential direction and in parallel in the axial direction, and needle-shaped rollers 42 that are inserted into each of said pockets 41a. Furthermore, pockets 41a are formed so that their dimensions are slightly larger than the dimensions of rollers 42 with the exception of the dimensions between each of the retaining projections to be described later.

Figure 13:
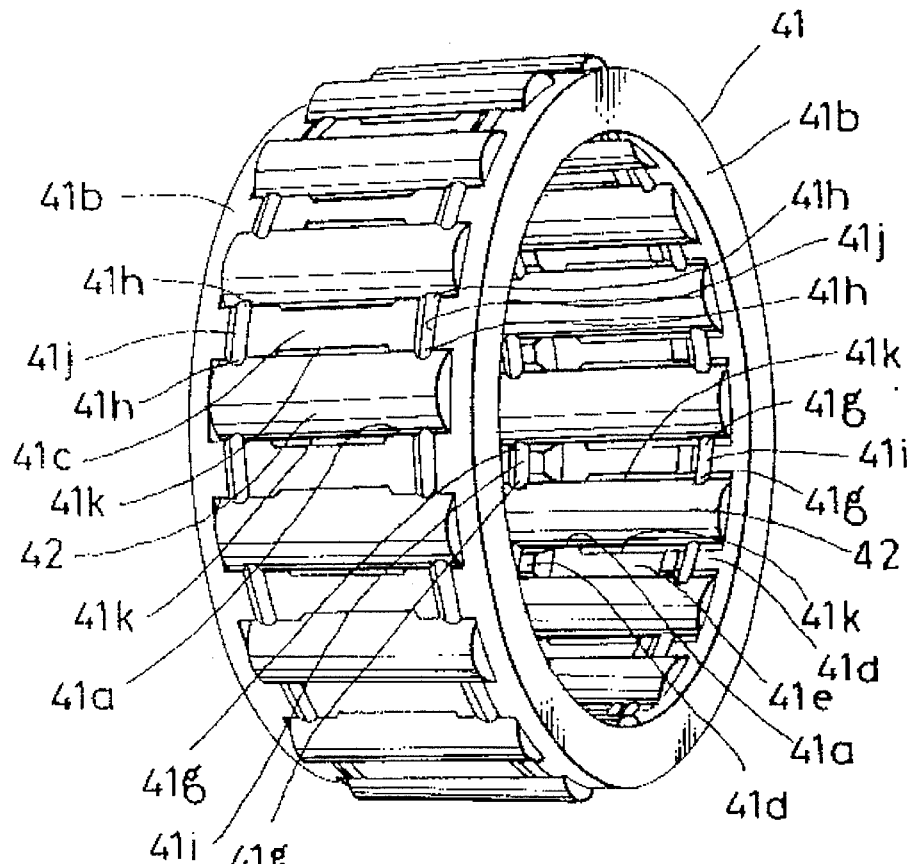
FIG. 13 is a perspective view of a fifth embodiment of the roller and cage assembly of the present invention.
Figure 14:
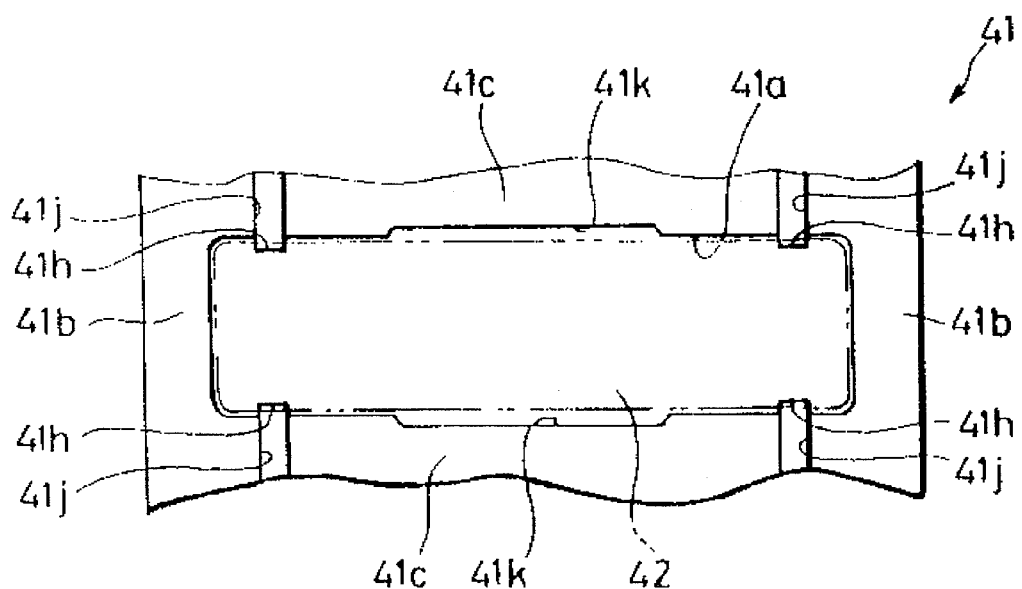
FIG. 14 is an overhead view of a portion of the roller and cage assembly shown in FIG. 13.

Cage 41 forms two (cage) rings 41b and (cage) bars 41c, that mutually couple both said rings 41b and demarcate said pockets 41a together with said rings 41b, into a single unit. As is clear from FIGS. 15 and 16, bars 41c have thick-walled portions 41d, each connected to both rings 41b, and thin-walled portions 41e juxtaposed between said thick-walled portions 41d. Roughly U-shaped concave portion 41f is demarcated on the inside of cage 41 by these thick-walled portions 41d and thin-walled portions 41e. Furthermore, thick-walled portions 41d and thin-walled portions 41e are also shown in FIG. 13. Said concave portion 41f is provided in the form of a so-called lightening hole for reducing the weight of cage 41, and extends farther to the outside than the pitch circle diameter (P.C.D.) of roller 42.

Inner retaining projections 41g are formed on both sides of the inner surfaces in the vicinity of both ends of said bars 41c, namely in each of thick-walled portions 41d, while a pair of outer retaining projections 41h are formed on the outside at sites corresponding to said inner retaining projections 41g. These inner retaining projections 41g and outer retaining projections 41h protrude so as to face inside pockets 41a, and the interval between corresponding retaining projections of neighboring (cage) bars 41c in the circumferential direction is set to be slightly smaller than the diameter of rollers 42. As a result, rollers 42 are retained and thereby restricted from falling out of pockets 41a.

The above-mentioned inner retaining projections 41g and outer retaining projections 41h are formed by providing two each of caulking grooves 41i and 41j so as to extend in the circumferential direction in both the inner and outer surfaces of bars 41c. Thus, since each retaining projection is formed only by caulking processing, they facilitate volume production and can be fabricated inexpensively. In addition, since these caulking grooves 41i and 41j act as so-called oil grooves, efficient lubrication is performed.

As is clear from each of the drawings, concave portions 41k of a prescribed length are formed in both sides of each bar 41c, and more specifically, in both sides of thin-walled portions 41e, so as to extend the width of a portion of said pockets 41a demarcated by said bars 41c. These concave portions 41k act as oil grooves together with said caulking grooves 41i and 41j. However, in order to maintain the rigidity of thin-walled portions 41e, the width dimensions of which have become smaller as a result of providing these concave portions 41k, the thickness $t_1$ (FIG. 15) of said thin-walled portions 41e is set slightly thicker.

As described above, since a large number of oil grooves are provided, lubrication is adequately performed and seizure is prevented, thus making said roller and cage assembly suitable for high-speed rotation.

Figure 15:
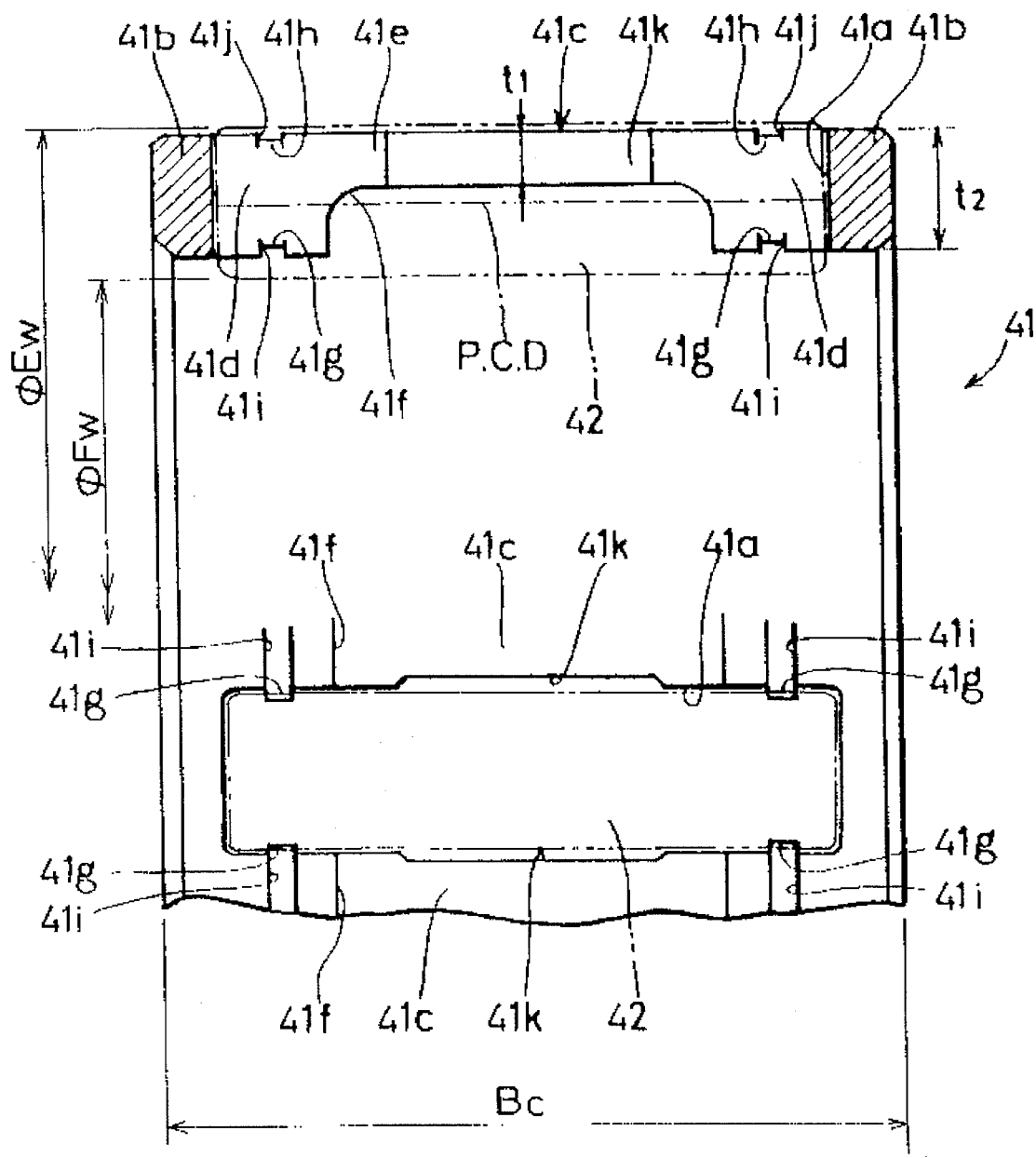
FIG. 15 is a longitudinal cross-sectional view of the state in which a portion of the roller and cage assembly shown in FIG. 13 is severed along a surface including the axial direction.

Furthermore, as is clear from FIG. 15, with respect to thick-walled portions 41d that compose bars 41c together with the above-mentioned thin-walled portions 41e, since their thickness $t_2$ is set larger to be equal to the thickness of rings 41b, together with this allowing their shape to be simplified as well as facilitating cutting processing to allow them to be fabricated inexpensively, the rigidity of bridges in the form of bars 41c is improved thus making caulking processing easier. Thus, the above-mentioned inner retaining projections 41g and outer retaining projections 41h can be formed with high precision, and the amount of their protrusion can be stabilized, thus allowing them to reliably retain rollers 42.

Figure 16:
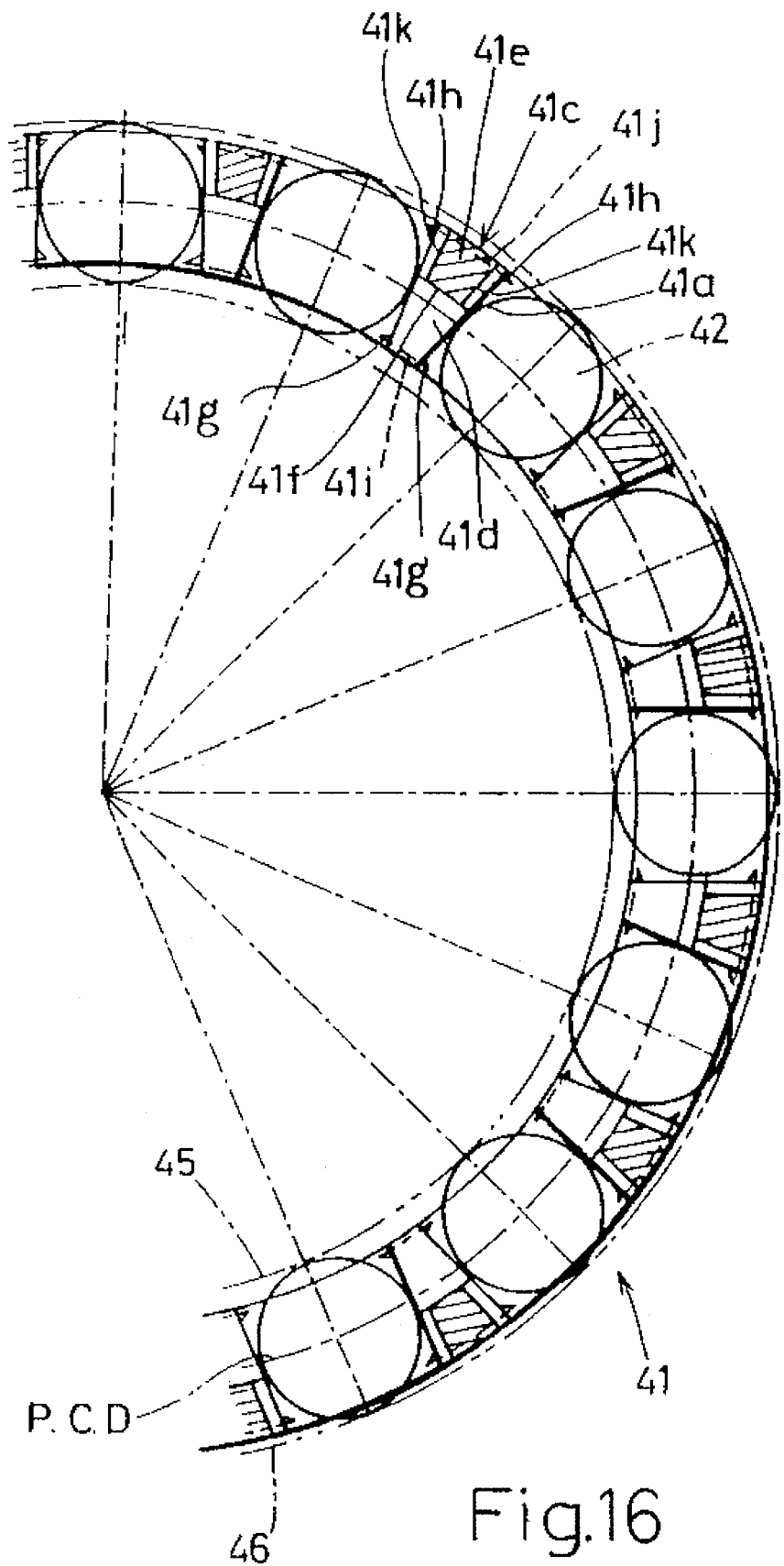
FIG. 16 is a longitudinal cross-sectional view of the state in which a portion of the roller and cage assembly shown in FIG. 13 is severed along a surface perpendicular to the axial direction.

FIG. 16 shows said roller and cage assembly being used by fitting onto shaft 45 and outer ring 46. When used in this manner, roller 42 makes contact with roller guiding surfaces formed on both sides of the above-mentioned thick-walled portion 41d. Roller 42 is then guided nearly over P.C.D., and dimensions are set so that it does not make contact with inner and outer retaining projections 41g and 41h. Moreover, dimensions are also set so that the traveling surface of outer ring 46 and the outer surface of cage 41 make contact before contact is made between the inner surface of cage 41 and shaft 45.

In the above-mentioned roller and cage assembly, cage 41 is made of, for example, cemented steel (SCM415, STKM13 and so forth).

On the other hand, ceramics is employed for the material of each of rollers 42 equipped on said roller and cage assembly, and said ceramics is, for example, silicon nitride ($Si_3N_4$).

Since the roller and cage assembly as claimed in the present invention is equipped with rollers made of ceramics, it was confirmed by the following experiment that the temperature rise accompanying its rotation is suppressed to a low level.

This experiment consisted of placing the roller and cage assembly as claimed in the present invention having the above-mentioned composition, and a conventional roller and cage assembly equipped with rollers made of ball-bearing steel in which the dimensions of each portion are equal to those of said roller and cage assembly, on a fluctuating load bearing tester under the same conditions. The temperature rises of both assemblies were then measured over time. Each of the roller and cage assemblies used as the testpieces in this experiment were both fabricated for use with engine connecting rods, and particularly as large end bearings. Each of the major dimensions shown in FIG. 15 are set as shown below. In addition, the roller and cage assemblies used had 14 rollers.

Fw: Inner contact diameter=22 mm

Ew: Outer contact diameter=29 mm

Bc: Cage width=17 mm

Furthermore, the experimental conditions were set as shown below.

Rotating speed: 5000 rpm

Load: ±1000 kgf

Lubrication: 1 liter/min (forced lubrication)

Temperature measurement site: Outer surface of the outer ring fit onto the outside of the roller and cage assembly (ball-bearing steel: SUJ2, external dimension: 40 mm)

Figure 17:
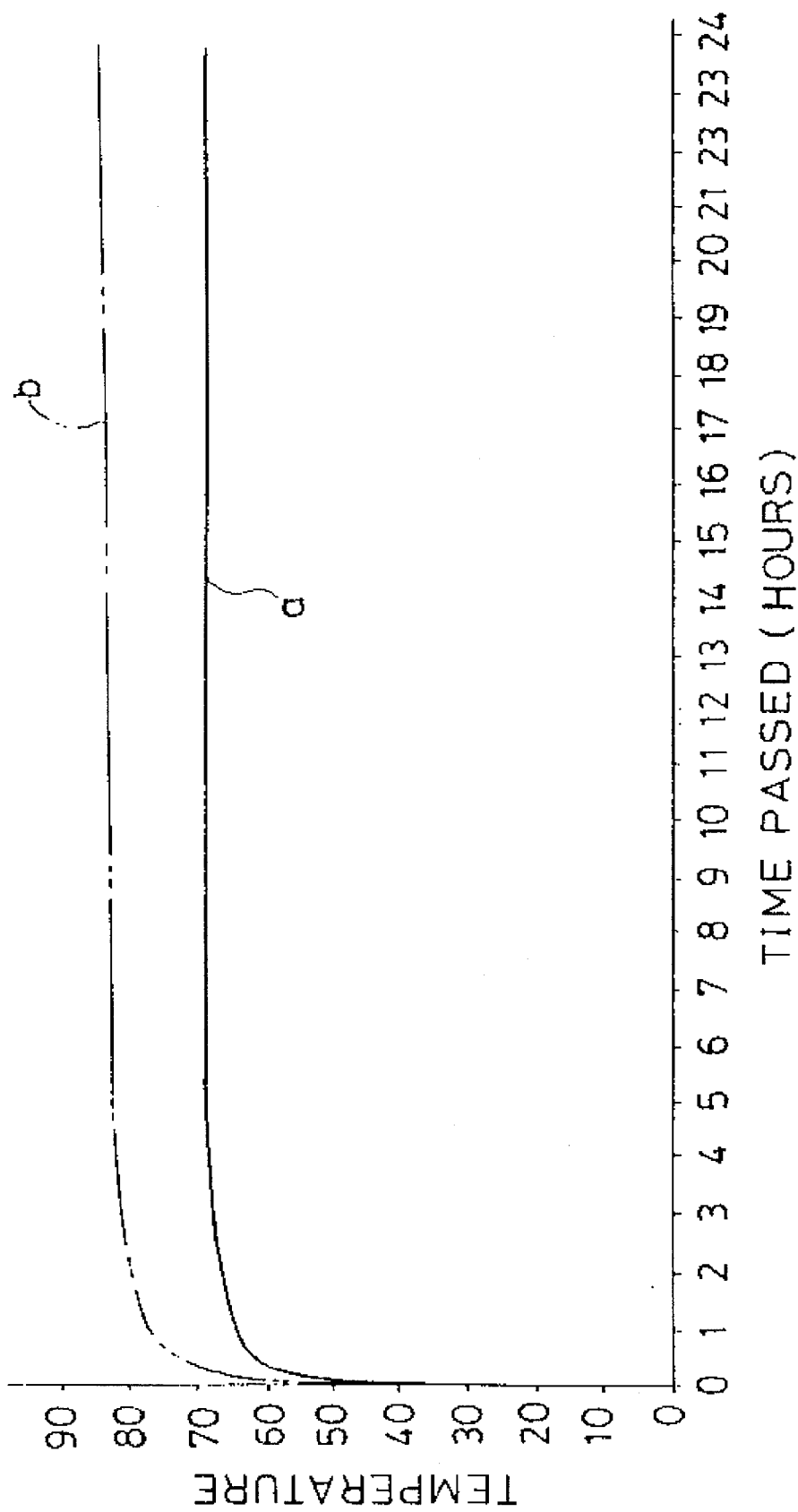
FIG. 17 is a graph showing the data obtained by placing the roller and cage assembly shown in FIGS. 13 through 16 and the roller and cage assembly of the prior art on a fluctuating load bearing tester.

The results of the above-mentioned experiment are shown in FIG. 17. In FIG. 17, solid line a indicates the measured values relating to the roller and cage assembly as claimed in the present invention, while broken line b indicates the measured values relating to the roller and cage assembly of the prior art. As shown in the graph, the maximum temperature measured for the roller and cage assembly as claimed in the present invention equipped with rollers made of ceramics was 68° C., while the maximum temperature measured for the roller and cage assembly of the prior art was 85° C., thus indicating that the roller and cage assembly as claimed in the present invention is able to significantly suppress temperature rise in comparison with the roller and cage assembly of the prior art.

As is clear from these results, the roller and cage assembly as claimed in the present invention is suitable for use during high-speed rotation such as for engine connecting rods.

In addition, in the case of ceramic rollers 42, if, for example, their diameter and length are 3.5 mm and 13.8 mm, respectively, their weight is only 0.42 g, thus achieving a weight reduction of 58% in comparison with ball-bearing steel rollers of the same dimensions weighing 1.01 g. Thus, the rotating portion equipped with said roller and cage assembly is lighter in weight, thus contributing to higher engine speed.

Figure 18:
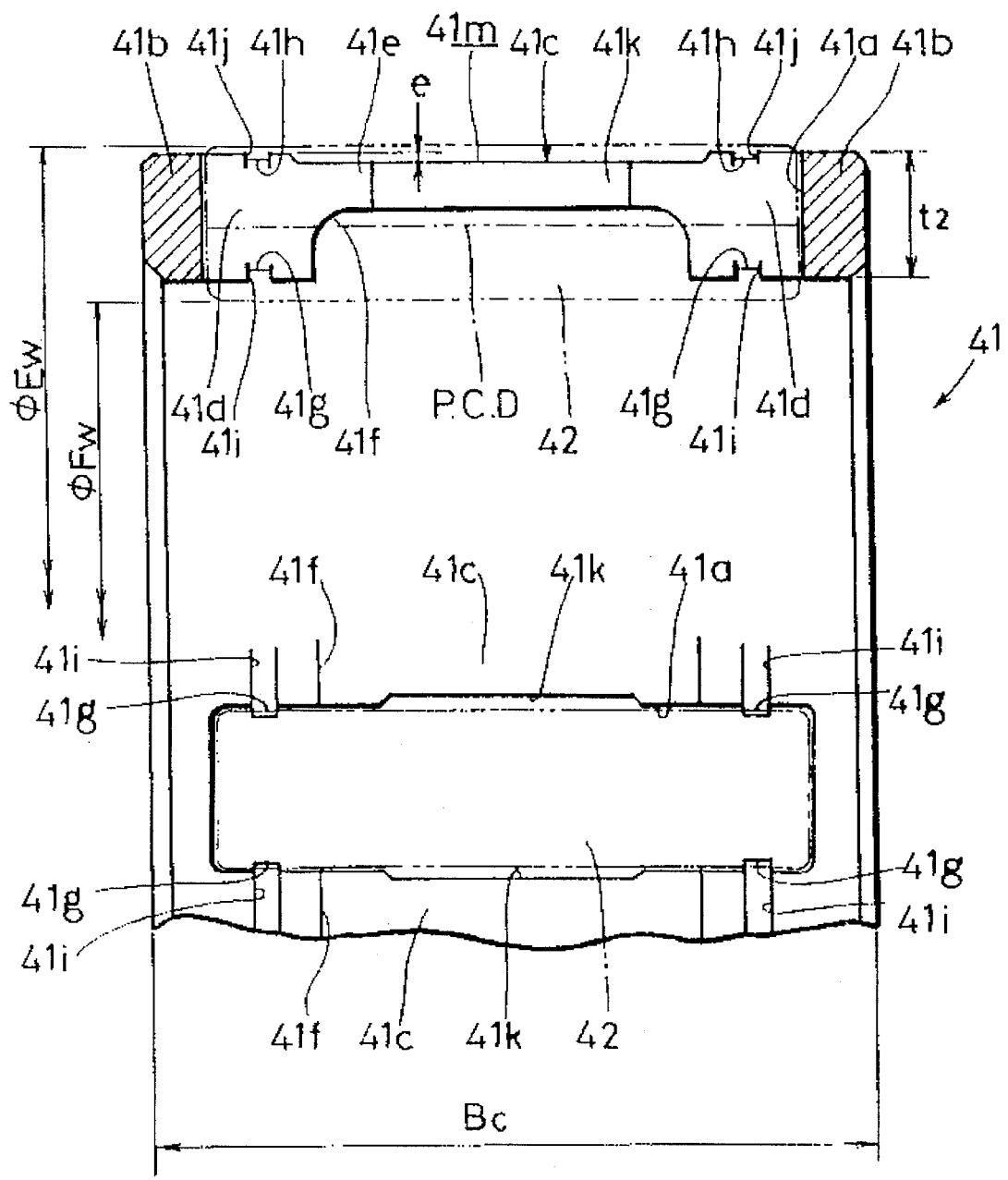
FIG. 18 is a longitudinal cross-sectional view of the state in which a portion of a sixth embodiment of the roller and cage assembly of the present invention is severed along a surface including the axial direction.

The following provides an explanation of a sixth embodiment of the roller and cage assembly of the present invention using FIG. 18. Furthermore, since said roller and cage assembly is composed in the same manner as the fifth embodiment of the roller and cage assembly shown in FIGS. 13 through 16 with the exception of those portions explained below, an overall explanation will be omitted here, with the explanation only focusing on the essential portions. In addition, the same reference numerals are used for those constituent members that are identical to the constituent members of the roller and cage assembly of the fifth embodiment.

As shown in the drawing, in this roller and cage assembly, concave portions 41m are formed extending in the axial direction in the inside of outer retaining projections 41h and in the outside of each (cage) bar 41c of cage 41. These concave portions 41m are formed over the entire width of bars 41c, and their depth is set to roughly 0.1–0.2 mm. These concave portions 41m also act as oil grooves to increase the lubrication property, thus making it difficult for seizure and so forth to occur even in the case of high-speed rotation. In addition, as a result of providing said concave portions 41m, together with the surface area that makes contact with the inner diameter side of a connecting rod being decreased, the weight of the roller and cage assembly is further reduced.

Furthermore, although silicon nitride is used for the ceramic material of rollers 42 in each of the above-mentioned embodiments, other ceramics may naturally also be applied corresponding to the application of the roller and cage assembly and the magnitude of the load to be borne.

As has been explained above, in the roller and cage assembly according to the present invention, since an improved lubrication property is achieved while maintaining or increasing rigidity, said roller and cage assembly is suitable for use as a bearing equipped on the connecting rod and so forth of a high-speed engine as a result of offering the advantage of long service life.

On the one hand, in the roller and cage assembly according to the present invention, since a composite plated film, containing fluororesin particles having excellent self-lubrication property, is formed at prescribed sites, together with said roller and cage assembly having high wear resistance during low levels of lubrication, the temperature rise accompanying rotation is suppressed to a low level, thus making said roller and cage assembly suitable for use as a bearing equipped on the connecting rod and so forth of high-speed engine as a result of offering the advantage of long service life.

In addition, since said composite plated film can be formed less expensively than the silver plating performed in the prior art, an additional advantage is offered in the form of reduced costs.

Moreover, since said fluororesin particles demonstrate a cushioning action in addition to self-lubricating action, silencing effects are also obtained.

On the other hand, in the roller and cage assembly according to the present invention, as a result of the rollers being made of ceramics, the temperature rise accompanying rotation is suppressed to a low level, thus allowing said roller and cage assembly to be suitable for use as a bearing equipped on a connecting rod, and particularly the large end, of high-speed engines.

In addition, since ceramic rollers are lighter in weight than other rollers made of ball-bearing steel and so forth, the weight of the entire roller and cage assembly can be reduced, thus offering the advantage of being suitable for use in high-speed rotating portions.

What is claimed is:

1. A roller and cage assembly comprising:

a roughly cylindrical cage in which a plurality of bars are arranged in a row in the circumferential direction so as to demarcate a plurality of pockets in parallel in the axial direction;

rollers that are inserted into each of said pockets; and inner retaining projections and outer retaining projections that restrict said rollers from falling out to the inside and outside, which protrude so that a portion of said bars face said pockets as a result of providing caulking grooves on the inner and outer surfaces of each of said bars extending in the circumferential direction, wherein concave portions are formed in the center of the bars with respect to a width of the cage so as to extend across a portion of a width of said pockets on both sides of said pockets in the circumferential direction, padding being disposed in said concave portions to entirely fill said concave portions on an inside of said bars.

2. The roller and cage assembly as set forth in claim 1 wherein said cage has two rings formed into a single unit with said bars that demarcate said pockets together with said bars, roughly U-shaped concave portions are formed in the center of the insides of said bars extending further to the outside than the pitch circle diameter of said rollers and being shorter than the length of said pockets, thick-walled portions on both ends of said bars and said rings are formed to have roughly the same thickness, and said padding is formed at thin-walled portions in the center of said bars.

3. The roller and cage assembly as set forth in claim 1 wherein concave portions are formed that connect with said pockets in a portion of the outsides of said bars.

\* \* \* \* \*